United States Patent
Focke et al.

[11] Patent Number: 5,375,493
[45] Date of Patent: Dec. 27, 1994

[54] METHOD AND APPARATUS FOR FEEDING SEPARATOR SHEETS TO A STACK

[75] Inventors: Heinz Focke, Verden; Johannes Holloch, Langwedel, both of Germany

[73] Assignee: Focke & Co. (GmbH & Co.), Verden, Germany

[21] Appl. No.: 29,707

[22] Filed: Mar. 11, 1993

[30] Foreign Application Priority Data

Mar. 12, 1992 [DE] Germany ............... 4207808

[51] Int. Cl.⁵ ............... B65H 33/04; B65G 57/10
[52] U.S. Cl. ............... 83/94; 83/140; 83/153; 83/277; 83/382
[58] Field of Search ............... 53/157; 83/23, 89, 94, 83/153, 277, 140, 382

[56] References Cited

U.S. PATENT DOCUMENTS

| | | | |
|---|---|---|---|
| 4,015,702 | 4/1977 | Bergling | 83/153 |
| 4,297,927 | 11/1981 | Kuroda | 83/277 |
| 4,356,054 | 10/1982 | Götz | 83/382 |
| 4,376,400 | 3/1983 | Gazzarrini | 83/153 |

FOREIGN PATENT DOCUMENTS

| | | |
|---|---|---|
| 3702965 | 8/1988 | Germany. |
| 3825110 | 2/1990 | Germany. |

*Primary Examiner*—Hien H. Phan
*Attorney, Agent, or Firm*—Sughrue, Mion, Zinn, Macpeak & Seas

[57] ABSTRACT

An apparatus for feeding separator sheets (20) to a stack is disclosed. Separator sheets (20) made of paper or another material are disposed between carton layers (19) of a pallet (13) loaded with cartons (10). The separator sheets are produced by a separate separator sheet unit (25) by way of being severed from a web of material (21) and are placed onto the carton layers (19). The separator sheet unit (25) operates independently of a palletizer (12) for the cartons (10). The separator sheet unit (25) is comprised of a web conveyor (29) for transporting the web of material (21) in portions, and a blank conveyor (30) for receiving and transporting the separator sheets (20) and placing them on the carton layers (19). Additionally, a cutting unit (37) for severing a blank (23) is provided.

12 Claims, 3 Drawing Sheets

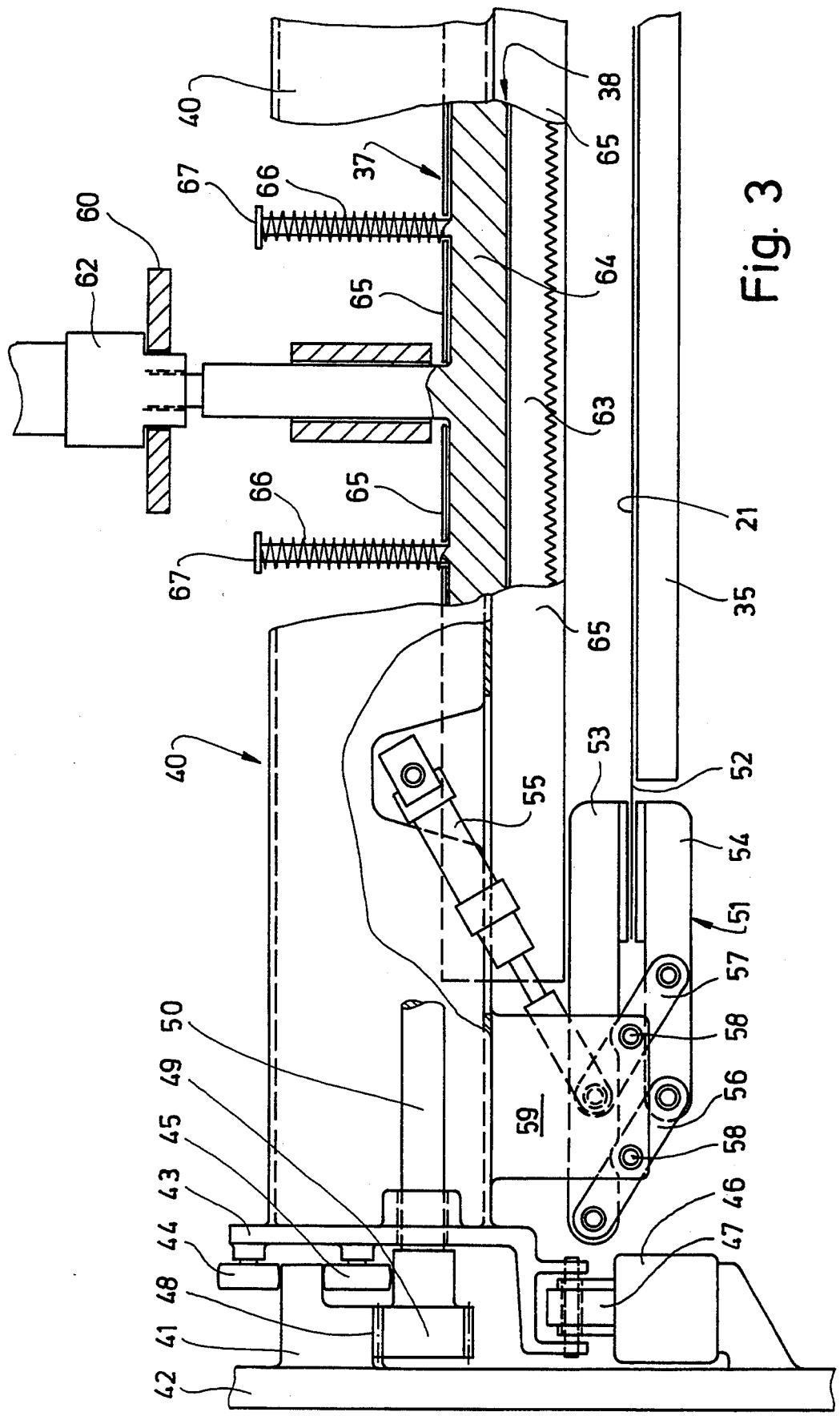

METHOD AND APPARATUS FOR FEEDING SEPARATOR SHEETS TO A STACK

BACKGROUND OF THE INVENTION

The invention relates to a method of feeding thin separator sheets to a stack of articles, especially cartons, which are stacked on a pallet or the like in layers, whereby a separator sheet formed from a blank which is severed from a continuous web of material is inserted between superposed layers (carton layers). Additionally, the invention relates to an apparatus for carrying out this method.

In the packaging art, smaller or larger articles are placed on pallets for transport. The articles, especially cartons or other packaging containers such as cans, bottles or the like are stacked in layers on the pallet or another support. Separator sheets made of thin material are inserted between the individual carton layers in order to secure the pack layers and facilitate their accurate positioning. These separator sheets are mostly made of paper or thin cardboard, but could also be made of another flexible material.

In a known method and apparatus, the cartons are stacked in layers on a pallet by means of a known palletizer having a pivotable articulated arm and a suction head (DE-A-37 20 933.7). In this prior art proposal, the separator sheet is severed from a web of material. The blanks which are formed in this manner are grasped by the palletizer, i.e. its suction head, and are placed on the (part) stack on the pallet in their correct position. Consequently, this prior art palletizer has a double function.

SUMMARY OF THE INVENTION

Starting out from this prior art, it is the object of the invention to increase the capacity of an installation for stacking articles such as cartons and other packaging containers.

To attain this object, the method according to the invention is characterized in that the web of material is conveyed in portions corresponding to the dimensions of a blank for a separator sheet, and in that a blank for a separator sheet is subsequently severed outside the region of the stack, and the separator sheet is then transported further and placed on the (part) stack or the layer (carton layer).

According to the apparatus of the invent ion, there is provided a separate unit (separator sheet unit) for this purpose which serves exclusively for producing and transporting the blanks for the separator sheet. This separator sheet unit operates independently of the palletizer, but in coordination therewith.

According to a further feature of the invention, the separator sheet unit is equipped with a first conveying means (web conveyor) for transporting a portion of the web of material which corresponds to the blank, and with a second conveying means (blank conveyor) for receiving the severed blank and for transporting it and placing the blank on the stack.

It is an important advantage of the invention that the operating steps of the palletizer can be coordinated with those of the separator sheet unit in such a way that there are temporal overlaps. The palletizer can, for example, grasp an article for a new layer while the separator sheet is still being positioned on the completed pack layer. Additionally, the operating steps of the separator sheet unit may partially overlap as well. For example, the web conveyor can grasp the web of material and advance a conveying portion while a severed blank is still being placed on the stack by the blank conveyor.

Further features of the invention relate to the structure of the separator sheet unit, especially its conveyors, and to a severing device for severing the blanks from the web of material.

BRIEF DESCRIPTION OF THE DRAWINGS

Further details are described hereinafter with reference to an exemplary embodiment of the apparatus according to the invention and the accompanying drawings, in which:

FIG. 3 is a rear view of FIG. 1, showing details of a severing device of the separator sheet unit on an enlarged scale and partly in vertical section.

DETAILED DESCRIPTION OF THE PREFERRED EMBODIMENT

Figure 1:
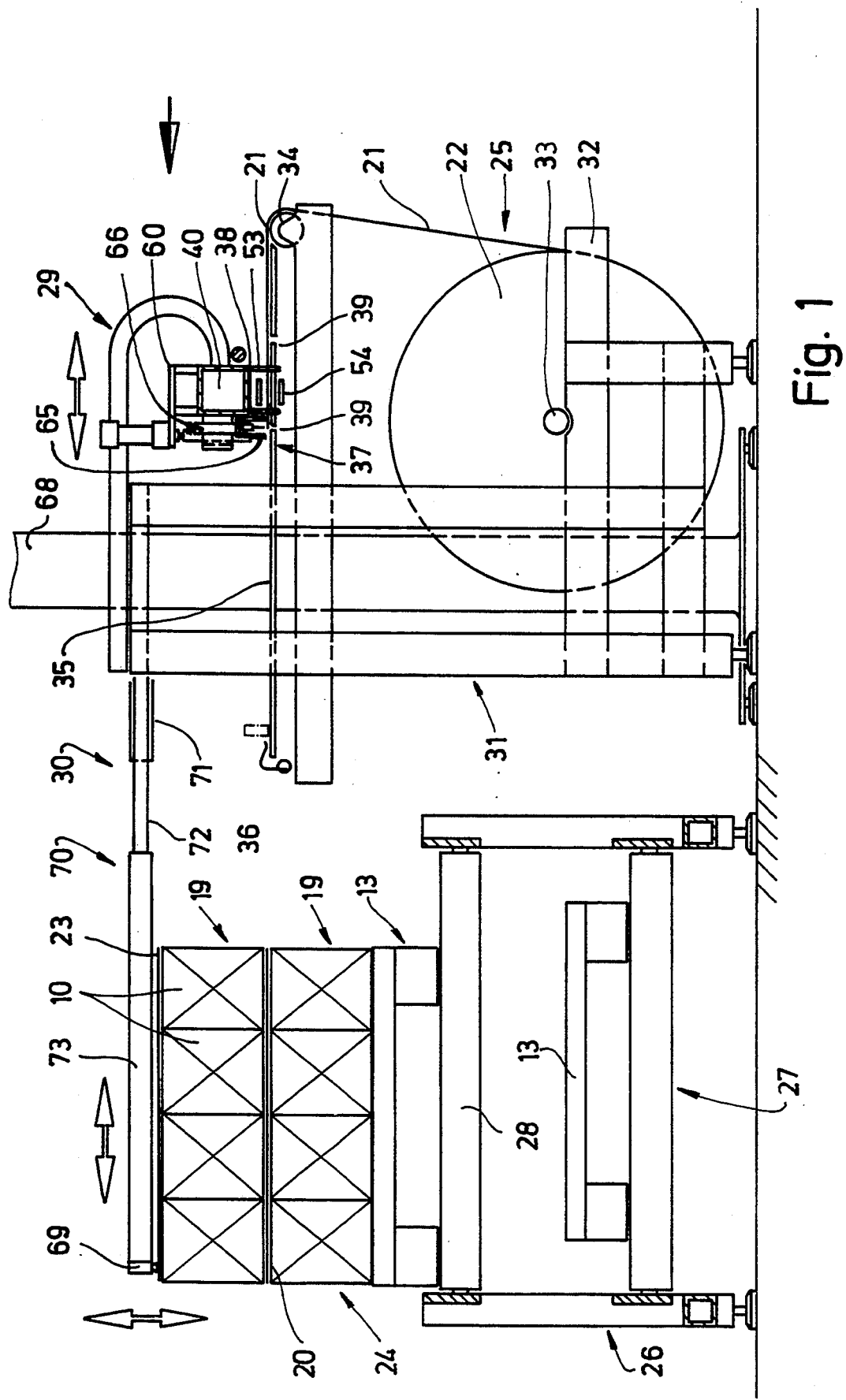
FIG. 1 shows a schematic side view of an installation for palletizing cartons.
Figure 2:
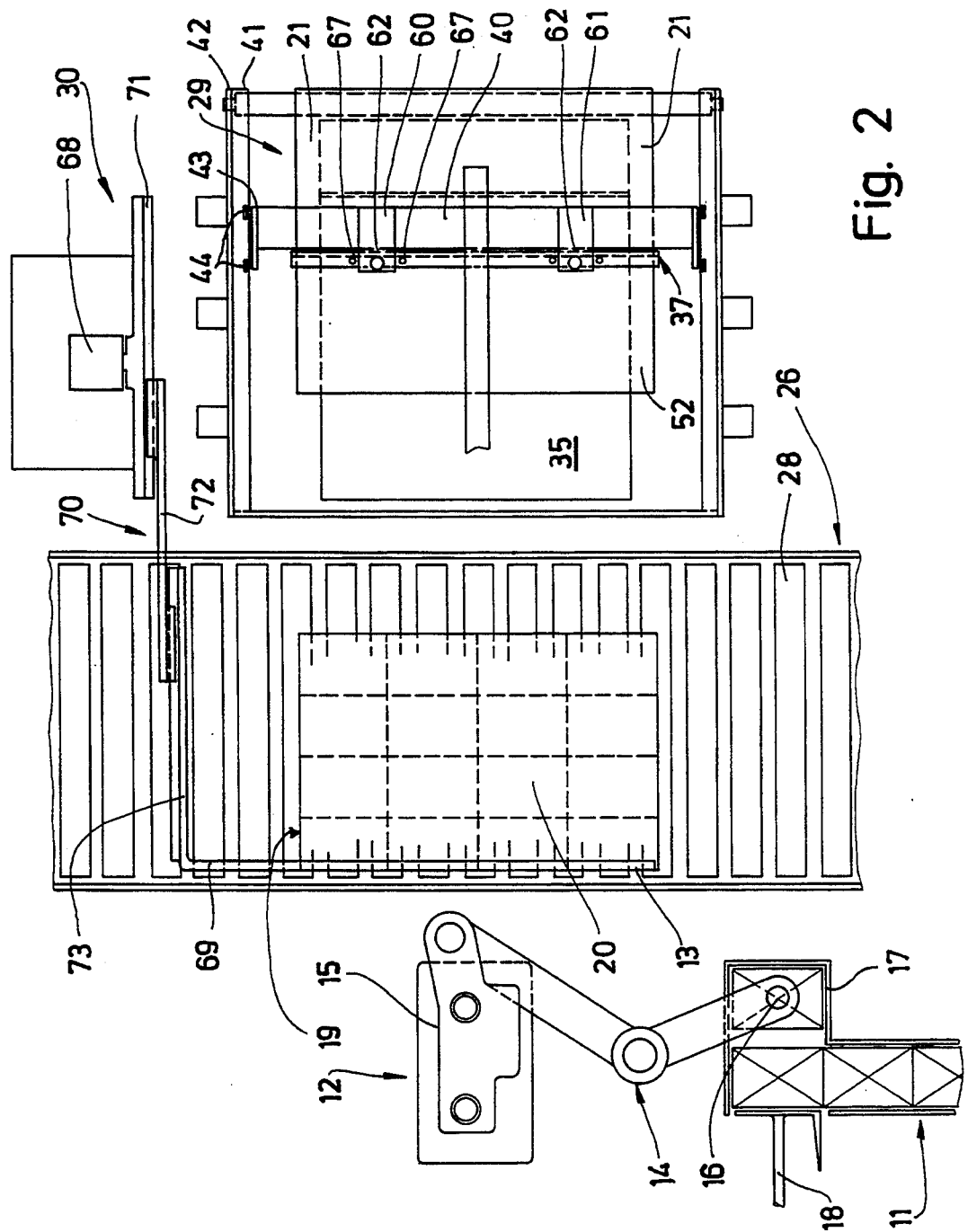
FIG. 2 shows a plan view of the installation of FIG. 1 with a palletizer.

The installation which is shown as a whole in FIGS. 1 and 2 serves for palletizing cuboid articles, namely cartons 10. These cartons arrive in succession on a feed conveyor 11. A palletizer 12 grasps the individual cartons 10 and places them on a pallet 13.

The palletizer 12 takes the conventional form of a robot having an articulated arm 14 which is mounted to be pivotable and vertically movable up and down on a supporting frame 15. At the free end of the articulated arm 14, there is a means for receiving the cartons 10, namely a suction head 16. This suction head grasps one carton 10 at a time at the top side by means of a vacuum. In the presently described exemplary emdodiment, the cartons 10 are removed from a platform 17 onto which the cartons 10 are conveyed in succession by a pusher 18.

The cartons 10 are placed on the pallet 13 in layers, thereby forming carton layers 19. Each carton layer 19 is comprised of several articles, i.e. cartons 10.

Separator sheets 20 are disposed between the carton layers 19 which are arranged on top of one another. These separator sheets are made of paper or another thin material. In the present case, the separator sheet 20 completely covers the top side of a carton layer 19.

The separator sheets 20 are severed in succession from a web of material 21. This web of material 21 is drawn off from a reel 22 in portions. The drawn off or advanced length of the web of material 21, i.e. a conveying portion thereof, corresponds to the dimensions of a separator sheet 20 in the longitudinal direction of the web of material 21. A corresponding blank 23 is severed from the web of material 21 and is fed to the pallet 13 where it is placed on the uppermost carton layer 19 of a (part) stack 24.

A separate unit in the form of a separator sheet unit 25 is provided for producing and handling the blank 23 or separator sheet 20. This unit operates independently of, but in coordination with the palletizer 12. In the presently described exemplary embodiment, the separator sheet unit 25 is arranged at a distance from the palletizer 12, specifically at the opposite side of the pallet 13. In the exemplary embodiment illustrated, the pallet 13 rests on a pallet track 26 which, in this case, has two conveying planes. The empty pallets 13 are delivered on a lower transport track 27 and are lifted to the loading plane in the region of a lifting station which is not shown in the drawings. The loading plane is designed at the same time as a discharge conveyor 28 for the loaded pallets 13. Consequently, the loading plane for the pallets 13 has a raised position.

The separator sheet unit 25 is provided with two conveying means, each carrying out its own independent conveying tasks. A web conveyor 29 has to draw off the web of materal 21 in portions—corresponding to the size of a blank 23—from the reel 22. A separate blank conveyor 30 receives the blank 23 which is severed from the web of material 21 and conveys it to the pallet 13 and positions the blank in the form of a separator sheet 20 on the uppermost carton layer 19.

The web conveyor 29 forms part of a separate unit having a supporting frame 31. In the lower region of the supporting frame, the reel 22 is mounted rotatably on supporting beams 32. A rod 33 which is passed through a central orifice of the reel 22 rests on the supporting beams 32 with its ends. The web of material which is drawn off from the reel 22 is deflected over a deflecting roller 34 to an elevated horizontal plane. Here, a portion of the web of material 21 is placed on a table board 35. A free front end of the web of material 21 is fixed on the table board 35 by a movable clamping means which is mounted below the table plate, namely by a clamping spring 36. In this position, a blank 23 is severed from the web of material in the region of the table board 35. For this purpose, a cutting unit 37 having a cutting knife 38 is installed above the table board 35. The table board 35 is provided with slits 39 so as to permit application of the severing cuts. Several slits 39 are disposed in the table board 35 in response to the possible dimensions of the blanks 23.

For the transport of the web of material 21, the web conveyor 29 can be moved to and fro at the level of the table board 35 or above the table board. A crossmember 40 which extends transversely relative to the conveying direction bears with rollers on or at lateral runway rails 41. The runway rails 41 are connected to lateral supporting means of the supporting frame 31, namely to supporting side plates 42. The crossmember 40 takes the form of an approximately square hollow profile. The rollers are disposed on an end plate 43 of the crossmember 40. In the exemplary embodiment illustrated, a runway trolley is formed in such a way that two rollers 44 and 45 are supported above and two below the runway rail 41 or a transversely directed leg thereof.

The reciprocating movement of the crossmember 40 above the table board 35 is in this case caused by a pressure medium cylinder 46 which is mounted on one side of the crossmember 40, namely on a supporting side plate 42, below the crossmember 40. The pressure medium cylinder 46 does not have a piston rod. An upwardly directed projection 47 which projects from the cylinder and is movable with the piston is connected to the end of the crossmember 40, in particular via a fork-like connection to a leg of the end plate 43.

To ensure a correct travel of the elongated crossmember 40 in spite of the unilateral application of driving stress by the pressure medium cylinder 46, a driving motion is transmitted to the opposite side of the crossmember 40 as well. For this purpose, runway rails 41 which extend on both sides in the conveying direction take the form of a rack having a toothing 48 on the bottom side. A gear wheel 49 is in engagement with the toothing 48. This gear wheel 49 is connected to a corresponding gear wheel on the opposite side via a shaft 50.

The shaft 50 is connected to the crossmember 40, in particular the end plates 43 thereof and, in the present exemplary embodiment, is mounted rotatably in the end plate 43. The driving motion is transmitted to both sides of the crossmember 40 as the gear wheels 49 roll off on both ends of the shaft 50.

The web conveyor 29, in particular its crossmember 40, is provided with means for grasping the web of material 21, namely clamping means 51 located in the region of lateral longitudinal edges of the web of material 21. To permit grasping of these edges, the table board 35 is smaller in width than the web of material 21. In the region of lateral projecting portions 52, the web of material 21 is grasped by the clamping means 51. Subsequently, an appropriate movement of the web conveyor 29 or crossmember 40 draws off a portion of the web of material 21 from the reel 22.

Each clamping means 51 is formed from two clamping jaws 53, 54 which are located, respectively, above and below the web of material 21. To grasp the web of material, the clamping jaws 53, 54 are moved away from one another upwards and downwards, respectively. A (pneumatic) cylinder 55 serves for operating the clamping jaws 53, 54. The piston rod of the cylinder 55 is connected to an actuating rod assembly for the clamping jaws 53, 54, namely to a parallelogram rod assembly comprising two parallel guide rods 56, 57. These guide rods are mounted pivotably with a central bearing 58 on a web 59 at the underside of the crossmember 40. When the guide rods 56, 57 are moved to a vertical position, the clamping jaws 53, 54 are opened. If the guide rods are moved in the opposite direction by way of extending the piston rod of the cylinder 55, the clamping jaws 53, 54 are closed. In this embodiment, the cylinder 55 is mounted within the crossmember 40 and protrudes through a recess in the underside of the crossmember.

In this exemplary embodiment, the cutting unit 37 is also attached to the crossmember 40, specifically on the forward side with respect to the conveying direction.

In the present exemplary embodiment, the cutting unit 37 is connected to the top side of the crossmember 40 by means of two spaced sup porting legs 60, 61. Actuating cylinders 62 are arranged inside the supportings legs 60, 61. The cutting knife 38 is held and moved up and down by the actuating cylinders 62. For this purpose, a saw-tooth-shaped knife blade 63 is attached to a supporting beam 64. This supporting beam is connected to the piston rod of the actuating cylinder 62. The supporting beam 64 is mounted in a holder 65 which has a U-shaped cross section. The knife blades 63 can be moved up and down with the supporting beam 64 within the holder 65 which is open at the bottom.

To apply a severing cut, the cutting unit 37 is moved downward by the actuating cylinder 62. The holder 65, which is also moved downward, is dimensioned such that, in the initial position and during the downward movement, lateral downwardly directed legs of the U-shaped profile project beyond the knife blade 63. As a result, the legs of the holder 65 are placed on the web of material 21 first. As the downward movement continues, the knife blade 63—together with the supporting beams 64—are moved downward relative to the holder 65, thereby applying the severing cut. This downward movement of the knife blade 63 is conducted against the restoring force of springs 66 which are arranged on upright holding rods 67. These holding rods 67 are connected to the supporting beam 64 and protrude upwardly through the holder 65. During the downward movement of the blade 63 and the supporting beam 64 relative to the holder 65, the springs 66 bear, on the one hand, against the top side of the holder and, on the other hand, against a collar or projection at the end of the holding rods 67.

After a severing cut has been applied, the cutting unit 37 is moved back to an upper initial position by the actuating cylinder 64. When the holding device 65 is lifted off, the effect of the springs 66 pulls the knife blade 63 upwards back into the holder 65. Thereafter, the entire unit is moved further upwards into a position illustrated by FIGS. 1 and 3.

The blank, which has been severed in the manner described in the foregoing, is grasped by the blank conveyor 30, drawn off from the table board 35 and fed to the pallet 13. The blank conveyor 30 forms a separate unit and is arranged next to the web conveyor 29 or its supporting frame 31. A supporting frame for the blank conveyor 30 is essentially comprised of an upright supporting column 68 with a base. The supporting column 68 stands laterally next to the supporting frame 31 in spaced relationship.

The blank 23 can be grasped by a conveying arm 69 of the blank conveyor 30. This conveying arm 69 extends transversely to the conveying direction. Means for grasping the blank 23, especially suction means, are located on the underside of the conveying arm 69. After the clamping spring 36 has been pivoted away downwardly, these suction means grasp a marginal region of the blank 23 which is the forward region with respect to the direction of movement. Thereafter, the conveying arm 69 is moved with the blank 23 to the pallet 13 or the (part) stack 24 in a coinciding horizontal and vertical movement. The conveying arm 69 takes along the blank 23 and is moved across the uppermost carton layer 19, with the blank 23 which is held only at a marginal region being pulled over an edge of the carton layer 19, if appropriate.

The conveying arm 69 is attached to a telescopic conveying arm 70 of the blank conveyor 30. An elongated and horizontally directed supporting piece 71 for the supporting arm 70 is located on the supporting column 68. The supporting piece 71 can be moved up and down on the supporting column 68. The supporting arm 70 is movable horizontally in an appropriate guide of the supporting piece 71. In this manner, it is possible to carry out a (coinciding) vertical and horizontal movement of the supporting arm 70.

The supporting arm 70 is formed from an intermediate arm 72 which is attached to the supporting piece 71 and from a further horizontal arm piece 73 which is connected to the intermediate arm and the conveying arm 69. The arm piece is connected to the intermediate arm 72 in a telescopic manner, specifically in a longitudinally displaceable manner. In this way, it is possible to extend the conveying path of, the conveying arm 69, in particular by way of displacing the intermediate arm 72 on the supporting piece 71 and by displacing the arm piece 73 relative to the intermediate arm 72.

The movements of the means are coordinated with one another in a way which permits short cycle times. The clamping means 51 are disposed downstream of the cutting unit 37 in the conveying direction. Consequently, the end of the web of material 21 which is the forward end after cutting can be grasped by the clamping means 51 while the severing cut is applied. As a result, the advance of the web of material 21 can be started directly after the severing cut has been applied. At the same time, the transport of the blank 23 to the pallet 13 is carried out by the separate blank conveyor 30. The palletizer 12 operates simultaneously with and independently of the operating steps described in the foregoing.

What is claimed is:

1. Apparatus for producing thin separator sheets (20) by severing them from a web (21) of material (21) conveyable in a conveying direction, for feeding the separator sheets (20) to a partial stack (24) of cartons (10) formed on a pallet (13), and for placing a separator sheet (20) on a layer of cartons (19) in the stack, the pallet (13) being loaded by a palletizer (12), said apparatus comprising a separator sheet unit (25), working independently of the palletizer (12) but in coordination therewith, for drawing off the web (21) from a reel (22);

said separator sheet unit (25) comprising:
a cutting unit (37) for severing from the web (21) a separator sheet (20) which said sheet unit (25) feeds to, and places on, the partial stack (24);
a web conveyor (29) for transporting a web portion having a length which corresponds to that of the separator sheet (20);
a sheet conveyor (30) for receiving the severed sheet (23), for transporting the sheet, and for placing the sheet on the partial stack (24); and
a horizontal table board (35) on which the web (21) is placed for severing of a sheet;
wherein said web conveyor (29) comprises a pair of clamping means (53, 54) for grasping the web (21) at laterally spaced, opposite longitudinal sides of the web, and
wherein said clamping means (53, 54) are located at opposite lateral sides of said table board (35) in such a manner that only laterally projecting regions of the web are grasped by said clamping means.

2. Apparatus according to claim 1, wherein said sheet unit (25) further comprises a crossmember (40) to which both said cutting unit (37) and said clamping means are attached, and which is movable in said conveying direction and also in a direction opposite thereto, wherein said cutting unit (37) is located downstream of said clamping means (53, 54) in said conveying direction.

3. The apparatus as claimed in claim 2, wherein the crossmember (40) extends laterally across the web of material (21), wherein rollers (44, 45) for supporting the crossmember are attached to ends of the crossmember, and wherein said clamping means (53, 54) for grasping the web of material (21) are attached to an underside of said crossmember (40).

4. The apparatus as claimed in claim 3, wherein said crossmember (40) is movable to and fro in said conveying and said opposite directions by a laterally, mounted pressure medium cylinder (46), and wherein a driving motion of the pressure medium cylinder (46) is transmittable to sides of the web conveyor (29) via a gear-type connection (48, 49, 50).

5. The apparatus as claimed in claim 1, wherein said cutting unit (37) comprises a severing knife blade (63), and wherein the table board (35) has a slit (39) for the passage of the knife blade (63) in a region of a severing cut which is to be applied to the web.

6. The apparatus as claimed in claim 5, wherein the cutting unit (37) has a holder (65) for fixing the web (21) and the sheet (23) on the table board (35) during a severing procedure, said holder being a U-shaped holder (65) which is movable up and down relative to the knife blade (63) and which has downwardly directed legs that are pressable onto the web of material.

7. The apparatus as claimed in claim 1, further comprising a pneumatic cylinder (55), wherein said clamping means comprise clamping jaws (53, 54) which are movable up and down relative to one another and which are actuated by said cylinder (55) via a parallelogram rod assembly comprising parallel guide rods (56, 57) and being mounted centrally in a fixed location.

8. The apparatus as claimed in claim 1, wherein the sheet conveyor (30) is disposed next to the web conveyor (29) on a separate supporting frame (68), in such a way that the sheet conveyor is movable up and down, and, in a conveying direction of the sheet (23), to and fro.

9. The apparatus as claimed in claim 8, wherein the sheet conveyor (30) has a conveying arm (69), which extends transversely relative to the conveying direction of the sheet (23), for grasping a marginal region of the sheet (23) which is the forward region with respect to the direction of transport, with the aid of suction means disposed at the underside.

10. The apparatus as claimed in claim 9, wherein the conveying arm (69) is movable up and down and, in the conveying direction of the sheet (23), to and fro, especially with the aid of a telescopically movable supporting arm (70) which is connected to the supporting frame (68).

11. The apparatus as claimed in claim 1, wherein the web conveyor (29) is movable to and fro above the web of material (21) and is, for this purpose, supported laterally next to the web of material (21) with rollers (44, 45) on runway rails (41) of a supporting frame (31).

12. Apparatus for producing thin separator sheets (20) by severing them from a web (21) of material (21) conveyable in a conveying direction, for feeding the separator sheets (20) to a partial stack (24) of cartons (10) formed on a pallet (13), and for placing a separator sheet (20) on a layer of cartons (19) in the stack, the pallet (13) being loaded by a palletizer (12), said apparatus comprising a separator sheet unit (25), working independently of the palletizer (12) but in coordination therewith, for drawing off the web (21) from a reel (22);

said separator sheet unit (25) comprising:
  a cutting unit (37) for severing from the web (21) a separator sheet (20) which said sheet unit (25) feeds to and places on, the partial stack (24);

said separator sheet unit (25) further comprising:
  a web conveyor (29) for transporting a web portion having a length which corresponds to that of the separator sheet (20); and
  a sheet conveyor (30) for receiving the severed sheet (23), for transporting the sheet, and for placing the sheet on the partial stack (24);
    wherein the web conveyor (29) comprises a pair of clamping means (53, 54) for grasping the web (21) at laterally spaced, opposite longitudinal sides of the web,
    wherein said sheet unit (25) further comprises a crossmember (40) to which both said cutting unit (37) and said clamping means are attached, and which is movable in said conveying direction and also in a direction opposite thereto, and
    wherein said cutting unit (37) is located downstream of said clamping means (53, 54) in said conveying direction.

* * * * *